United States Patent [19]
Yarbrough

[11] Patent Number: 4,518,548
[45] Date of Patent: May 21, 1985

[54] METHOD OF OVERLAYING SULPHUR CONCRETE ON HORIZONTAL AND VERTICAL SURFACES

[75] Inventor: Roger L. Yarbrough, Champaign, Ill.

[73] Assignee: Sulcon, Inc., Champaign, Ill.

[21] Appl. No.: 490,345

[22] Filed: May 2, 1983

[51] Int. Cl.³ .................... B28B 1/54; C04B 35/60
[52] U.S. Cl. ........................ 264/32; 156/71; 156/94; 264/34; 264/36; 264/135; 264/257; 264/332; 264/338; 264/DIG. 32
[58] Field of Search .............. 264/30, 34, 36, 241, 264/257, 332, 337, 338, DIG. 32, 32, 130, 134, 135, 228; 156/71, 94, 337; 106/89

[56] References Cited

U.S. PATENT DOCUMENTS

| 1,259,327 | 3/1918 | Wiederhold | 264/DIG. 32 |
| 2,954,301 | 9/1960 | Szukiewicz | 264/36 |
| 3,038,393 | 6/1962 | Nagin et al. | 264/36 |
| 3,080,253 | 3/1963 | Dietz et al. | 264/36 |
| 3,853,682 | 12/1974 | Hurst | 156/337 |
| 4,125,580 | 11/1978 | Lippert | 264/34 |
| 4,151,025 | 4/1979 | Jacobs | 156/71 |
| 4,259,127 | 3/1981 | Schachter | 156/71 |
| 4,350,551 | 9/1982 | Michaelson | 264/338 |

OTHER PUBLICATIONS

Pickard, Scott S., "Sulphur Concrete: Understanding/Application", Concrete International, Oct. 1981, pp. 57-67.

Primary Examiner—Jay H. Woo
Assistant Examiner—James C. Housel

[57] ABSTRACT

A method of overlaying sulphur concrete is adapted for use in placing sulphur concrete against or over an existing solid surface such as the exterior surface of a wall, floor, or column base. The existing surface, which typically is a portland cement concrete surface, is prepared by first applying a layer of a bituminous material containing a bitumen which liquifies at temperatures corresponding to the pour temperatures of the sulphur concrete. The sulphur concrete is poured against or over the bitumen-containing surface so that the bitumen therein melts to form a liquid slip plane. The shrinkage of the sulphur concrete which occurs during its temperature-reduction setting occurs without producing cracks because of the relative slippage permitted between the existing wall surface and the sulphur concrete.

9 Claims, 5 Drawing Figures

METHOD OF OVERLAYING SULPHUR CONCRETE ON HORIZONTAL AND VERTICAL SURFACES

Sulphur concrete is a structural concrete in which elemental sulphur modified by organic stabilizers serves as the cement or binder for the sand and aggregate. Although presently more expensive, sulphur concrete under certain conditions of use is much more durable and long-lasting than portland cement concrete. Sulphur concrete is much less subject to attack by acids and mineral salts. Therefore, sulphur concretes have important uses as construction materials for floors, walls and sump pits in the chemical, metallurgical, battery, fertilizer, food, pulp and paper industries. Sulphur concretes may also be advantageously used as road paving and bridge decking where salt corrosion problems are encountered. See, for example, Pickard, Scott S., "Sulphur Concrete Understanding/Application", *Concrete International,* October 1981, pages 57–67.

Sulphur concretes are applied as hot mixes with the temperature of the mix being above the melting temperature of the sulphur. After the sulphur concrete is poured, it is allowed to cool to solidify the sulphur and set the concrete. During the cooling and setting process, some shrinkage of the sulphur concrete occurs, which can cause cracking if the interface surface is restrained.

Frequently, it is desired to apply the sulphur concrete as an overlay to an existing floor or wall. The layer of applied sulphur concrete that comes in contact with the existing wall or floor (usually portland cement concrete) is cooled by the transfer of heat to the air, sides, and existing structure. The sulphur concrete at the interface thereby sets to a solid and rapidly bonds to the existing surface being effectively restrained from movement. Then, as the rest of the unbonded (unrestrained) sulphur concrete overlay cools and sets, a shrinkage differential occurs which can cause cracks to develop. Acids or salts can then penetrate through these cracks and continue to corrode the existing wall or floor surfaces.

The somewhat related problem caused by the thermoplastic characteristics of sulphur concrete is the unequal cooling and thereby unequal setting of the sulphur concrete experienced in the pouring of sulphur concrete walls or wall liners. The forms used for the sulphur concrete walls are usually open at the top, and thereby the top surface of the poured wall is exposed to ambient temperature and wind conditions. Therefore, the upper portion of the poured wall will cool more rapidly than lower portions of the wall. This prevents the upper portion of the wall from contracting uniformly and continuously as the shrinkage of the wall occurs during cooling and setting of the sulphur concrete. Voids in the wall may therefore develop, which reduce the structural strength of the wall, and which may also provide channels through which acids or salt ion penetrate and attack the old wall surfaces.

The foregoing problems have led to a recognized need for an improved method of overlaying sulphur concrete. In particular, it has been desired to provide for the inherent shrinkage of the poured sulphur concrete when applied over existing walls or floors, and avoiding or greatly reducing the tendency of the sulphur concrete to develop cracks or voids as it cools and sets.

SUMMARY OF INVENTION

In its generic aspect, this invention comprises an improved method of placing sulphur concrete against or over an existing solid surface such as the exterior surface of a wall, floor, or column base. The key step of the method is to first apply to the existing surface a layer of a bituminous material to form a bitumen-containing exposed surface thereon. The bitumen is selected so that it has a liquifying temperature corresponding to the temperature at which the sulphur concrete is to be initially placed. As the bituminous material, hot asphalt mixes may be used, or preformed sheets which can be applied cold. The sulphur concrete is then applied with the sulphur in molten condition, such as at temperatures in the range from 250 to 300° F. (121° to 149° C.). As the hot sulphur concrete contacts the bitumen surface, the bitumen melts to form a liquid slip plane in contact with the contiguous surface of the sulphur concrete, therefore preventing immediate bonding between the sulphur concrete and the existing surface. After standard finishing similar to that used with portland cement concrete, the sulphur concrete is allowed to cool and become set by the solidification of the sulphur cement binder. With this procedure the sulphur concrete can shrink during cooling/solidification, sliding on the liquid slip plane and without frictional or bonding restraint by the existing solid surface.

BRIEF DESCRIPTION OF THE DRAWINGS

The accompanying drawings, comprising

FIG. 1 is a perspective view illustrating the installation of a sulphur concrete wall liner against an existing concrete wall. Only partial sections of the form, the sulphur concrete wall overlay, and bituminous sheet liner are shown.

FIG. 2 is a cross-sectional elevational view of the wall installation system of FIG. 1.

FIG. 3 is a fragmentary cross-sectional view of a column base around which a sulphur concrete overlay is being installed by the method of this invention.

FIG. 4 is a fragmentary cross-sectional view illustrating the installation of a sulphur concrete overlay after an asphalt hot mix has been applied to the rough surface of an existing concrete floor.

FIG. 5 is a sectional view illustrating an alternative procedure for installing a sulphur concrete overlay on an existing concrete floor, using a bitumen sheet applied to a relatively smooth surface of an existing concrete floor.

DESCRIPTION OF PREFERRED EMBODIMENTS

Figure 1:
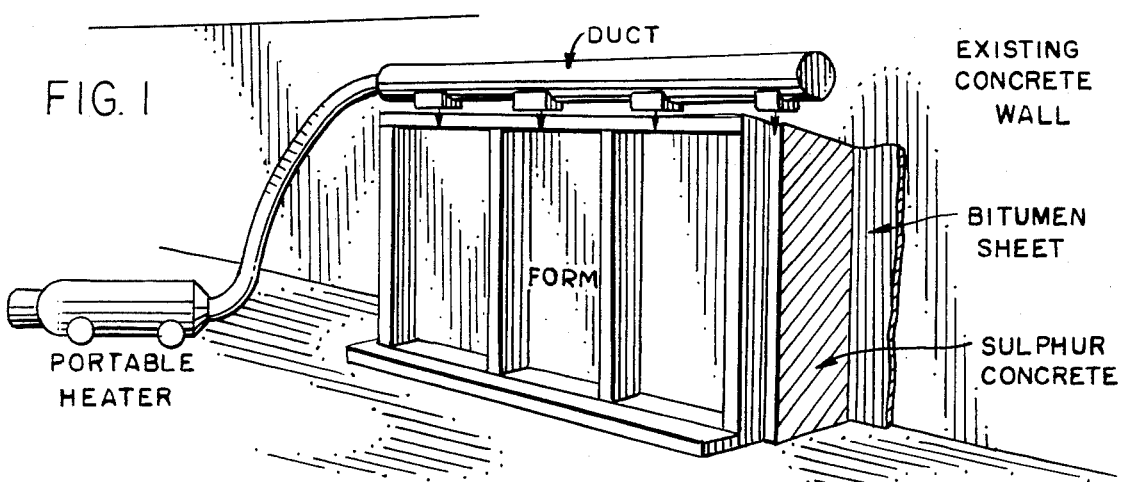
FIGS. 1–5, illustrate preferred embodiments of the method of this invention.

The method of the present invention may be used to install sulphur concrete against or over any existing solid surface such as the exterior surface of a wall, floor, or column base. Such existing structures are typically formed of portland cement concrete, but they may be formed of stone, metal, or other material, which it is desired to protect against attack by acids or metal salts. The existing surface may be smooth or rough, since the method of this invention can be adapted for use with either relatively smooth or very rough, pitted surfaces. Existing wall surfaces of portland cement concrete will usually be relatively smooth, while existing floor surfaces of portland cement concrete may be extremely rough due to the degradation of the floor by acid or other corrosive substances which attack the alkaline portland cement binder.

In preparation for placing sulphur concrete against an existing surface, a layer of bituminous material is applied to the surface to form a bitumen-containing exposed surface thereon. The bituminious material may be applied in a liquid or molten condition, or it may be applied in the form of bituminous sheet material. For example, an asphalt mix can be used and applied as a hot mix. Such mixes are formed of asphalt or similar bituminous material with a particular softening or melting temperature range, and the asphalt is in admixture with a fine aggregate which is usually sand. In general, the asphalt or other bitumen is selected so that it has a liquifying temperature or temperature range corresponding to the temperature at which the sulphur concrete is to be initially placed. For example, the liquifying temperature may be in the range of 250° to 300° F. (121° to 149° C.), typically a liquifying temperature of below 270° F. (132° C.), where the sulphur concrete is initially applied at a temperature of around 275° to 285° F. (135°–141° C.).

Hot asphalt mixes of the kind described are used most advantageously in coating existing floor surfaces, particularly portland cement concrete floors which are badly deteriorated and therefore rough and irregular. The amount of the hot asphalt mix to be applied should be at least sufficient to fill all of the depressions in the floor and produce a smooth continuous bituminous surface. This asphalt leveling course may range in thickness from about ½ to 4 inches, or more depending on the condition of the existing concrete surface. The applied asphalt layer is allowed to cool and solidify. While cooling and setting, it may be worked, rolled, or otherwise finished to give a relatively smooth exposed bituminous surface.

Where the existing floor surface is smooth, or where the sulphur concrete is to be applied against an existing wall, the bituminous material is applied to the existing surface as a preformed sheet. Where required, however, wall surfaces may also be coated with a liquified bituminous material, such as a hot asphalt mix. Suitable bituminous sheet material is available commercially, being the kind of bituminous material conventionally used in bridge construction, such as for forming a barrier between the concrete decking of highway bridges and the subsequently applied road surfacing material. One specific material which can be employed is sold as "Royston Bridge Membrane", by Royston Laboratories, Inc., Pittsburgh, Pa. It consists of a fiberglass mesh interlayer sandwiched between outer layers of polymer-modified bitumen. Typically, this product has a thickness of about 60 mils and is furnished in 48 inch wide roles. For certain purposes, the Royston Bridge Membrane is provided with a polyester film on the top or outer surface. For purpose of the present invention, however, the outer surface should be an exposed bitumen surface. The lower or inner surface of the membrane is a tacky or sticky surface, which as supplied is covered by a protective release paper. The release paper is removed before the membrane is applied to the existing wall or floor surface, and pressed into adhering engagement therewith. The adhesive attachment may be promoted by using an adhesive coating agent, which is applied to the existing surface. For example, Royston Bridge Membrane Primer may be used. This product is a synthetic rubber and resin based formulation in an organic solvent system.

As indicated above, the bitumen in the preformed sheet should be liquified at a temperature corresponding to the temperature at which the sulphur concrete is poured. The thermoplastic rubber-modified bituminous material of the Royston Bridge Membrane softens at 240° F. and will form a liquid slip plane at temperatures of 250° F. and above. This permits the sulphur concrete to be applied at the normal pour temperature range of 250° to 285° F. (135°–141° C.). The thickness of the preformed bituminous sheet is not critical, but usually for economy reasons it is desirable to employ relatively thin sheets, such as sheets ranging in thickness from about 40 to 100 mils. As indicated, such sheets may be given adequate strength by incorporating an inner layer of fiberous material, such as a fiberglas mesh.

Any of the various kinds of sulphur cement may be used in preparing the sulphur concrete. Preferably, the elemental sulphur has been reacted with a modifier for control of the crystal form of the sulphur. When molten or liquid sulphur is in the monoclinic crystalline form, and it is desired to prevent recrystallization of the sulphur during cooling and solidification to the orthorhombic crystalline form, which has proven to produce non-durable concretes. A preferred stabilizer system uses 5% by weight based on the sulphur of a modifier composed of equal parts of dicyclopentadiene (DCPD) and oligomers of cyclopentadiene (CPD). For example, the CPD may be in the form of trimers through pentamers. See McBee, et al, "Modified-Sulphur Cements for Use in Concretes, Flexible Pavings, Coatings, and Grouts", Bu. Mines RI 8545, 1981, pages 1–24. Modified sulphur prepared as described by McBee, et al is available commercially from Chemical Enterprises, Inc., Houston, Tex., as "CHEMENT 2000". Other modified sulphurs, as is known in the art, although not as desirable, can be employed. For example, it is known that sulphur can be partially stabilized by combination with olefinic hydrocarbon polymer materials, as described in U.S. Pat. No. 4,058,500.

In typical formulations for sulphur concrete mixes, the modified sulphur is combined with dense-graded sand and aggregate. The aggregate is selected to be resistant to attack by acids and metal salts, usually quartz-type. Calcareous minerals, such as limestone or marble, are not used because of their vulnerability to corrosive attack. In addition to the sand and aggregate, fly ash may be included, as is conventionally done in portland cement concrete mixes. For example, the fly ash may be a Class F type (American National Standard).

Typical proportions of sulphur concrete mixes are as follows:

| Ingredients | Weight Percent |
| --- | --- |
| Sulphur | 13–16% |
| Fly Ash | 8–11% |
| Quartz Sand | 38–42% |
| Aggregate (Acid Resistant) | 34–38% |

The method of this invention is further illustrated by the following examples and with reference to the accompanying drawings.

EXAMPLE I

Figure 2:
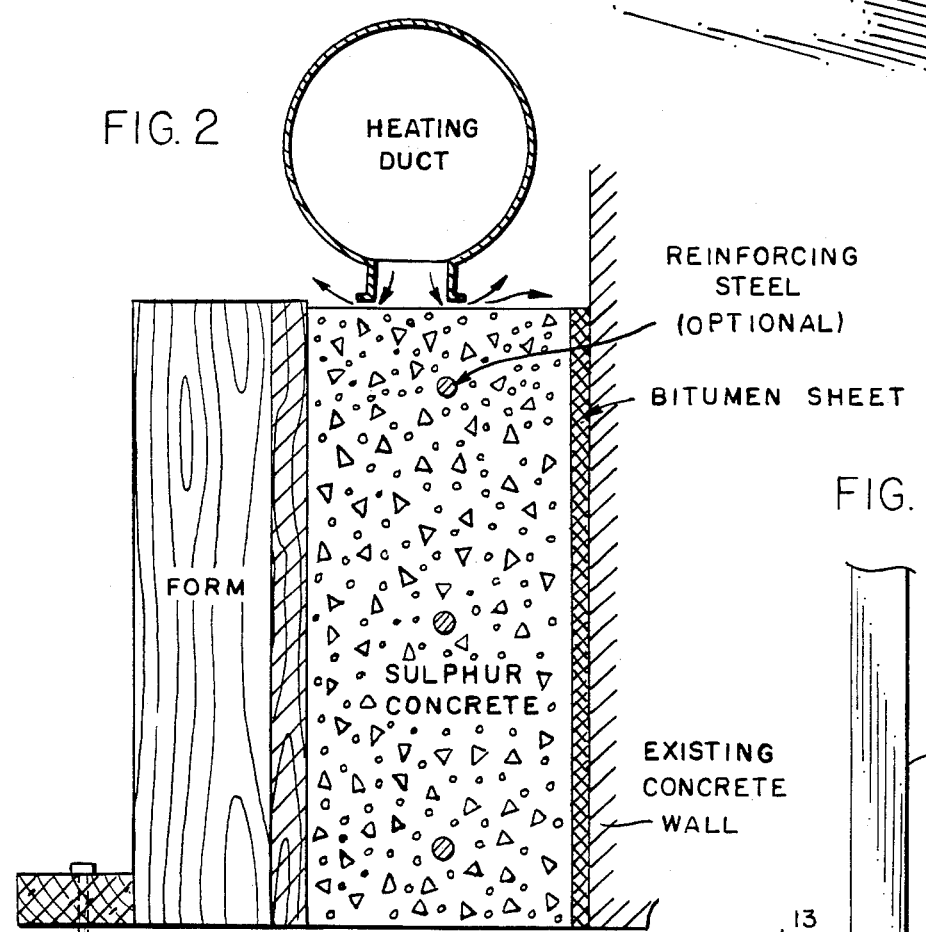

FIGS. 1 and 2 of the drawings illustrate an example of the installation of a sulphur concrete wall liner against an existing wall of portland cement concrete. As shown in both figures, a bitumen sheet has been applied to the outer surface of the existing concrete wall. The bitumen sheet is a Royston Bridge Membrane (Royston Laboratories, Inc., Pittsburgh, Pa.) consisting of outer layers of polymer modified bitumen. The outer layer of the bitumen sheet provides an exposed bitumen surface, and the inner layer is sticky, adhesively attaching to the existing wall. The bitumen sheet has a thickness of about 60 mils and is reinforced internally with a fiberglass mesh. The bitumen in the surface begins to soften at about 240° F. (116° C.), and liquifies at a temperature below 275° F. (135° C.).

A sulphur concrete mix is prepared using as the modified sulphur, the "CHEMENT 2000" sulphur product of Chemical Enterprises, Inc. The proportions of the mix are as follows:

| Ingredients | Weight Percent |
| --- | --- |
| Modified Sulphur | 14–16% |
| Class F Fly Ash | 8–10% |
| Quartz Sand | 38–41% |
| Aggregate (Acid Resistant) | 35–38% |

The fly ash is Class F as defined by ASTM C618-78, and the sand has the specifications of ASTM C333-77, being a fine aggregate, washed and well-graded, and free of expansive clays. The course aggregate conforms to ASTM C333-77, having a maximum size of ⅜ inches, and is free of expansive clays. The acid resistance of the aggregate may be determined by testing for weight loss during an acid leach of 24 hours in 20% aqueous HCl. The weight loss should be no greater than 5%.

The sulphur concrete may be produced on site using a mobile batch plant. Sand and aggregates may be loaded into separate bins and then conveyed through a gate system which feeds and mixes the sand/aggregate in proper proportions. A diesel-fuel-fired heating system can be used to dry and super-heat the sand/aggregate to 380° F. (193° C.). The hot sand/aggregate can be augered into a hopper/scale where the correct amount for a specific batch volume is weighed before it is conveyed into a mixer truck.

The hot sand/aggregate is conveyed into the mixer truck first, followed by the dry modified sulphur. The sulphur immediately melts upon contact with the hot sand/aggregate and is thoroughly mixed with the sand and aggregate. The fly ash is then conveyed into the mixer truck and thoroughly integrated into the sulphur concrete mix.

A typical mixer truck is a standard 7 cu. yd. tilt-up mixer with the drum enclosed in a steel shroud. Openings at the axis ends allow the drum to rotate. The annular space between the shroud and the drum is heated to maintain the sulphur concrete mix at 280° F. (138° C.).

The sulphur concrete is placed at 280° F. (138° C.). For example, the hot mix is poured into the form illustrated in FIGS. 1 and 2. The wall overlay may have a thickness of several inches, such as, for example, 4 to 6 inches. The molten sulphur concrete is consolidated by internal vibration. The outlet duct of a portable heater, as illustrated in FIGS. 1 and 2, is placed on top of the poured wall liner. The duct is connected to a portable heater equipped with a fan for moving heated air through the duct. As shown in FIG. 2, the heating duct has spaced outlets which release the heated air onto the top of the sulphur concrete in the open-topped form. Typically, the temperature of the delivered air will range from about 270° F. to 290° F. (132° C. to 143° C.).

When the sulphur concrete is introduced into the form, the bitumen in the adjacent surface of the bitumen sheet is liquified and lubricates the interface so that the sulphur concrete can shrink unrestrained during cooling, thereby releasing any stresses built-up in the sulphur concrete during shrinkage, which prevents random cracking. In addition, the heating of the upper portion of the sulphur concrete wall prevents too rapid cooling of the upper portion, permitting solidification and shrinkage to occur throughout the wall without the formation of voids due to premature setting of the upper portion of the wall. After the sulphur concrete in the middle and lower portions of the wall has begun to solidify and shrink, application of hot air through the heating duct is discontinued, any slump in the top surface of the well is topped off with fresh sulphur concrete, and the wall is permitted to cool to ambient temperature, thereby becoming fully set. Since high early strength is a characteristic of sulphur concrete, the form may be removed within several hours and additional finishing may be applied, if desired, to the exposed surface of the sulphur concrete wall.

EXAMPLE II

Figure 3:
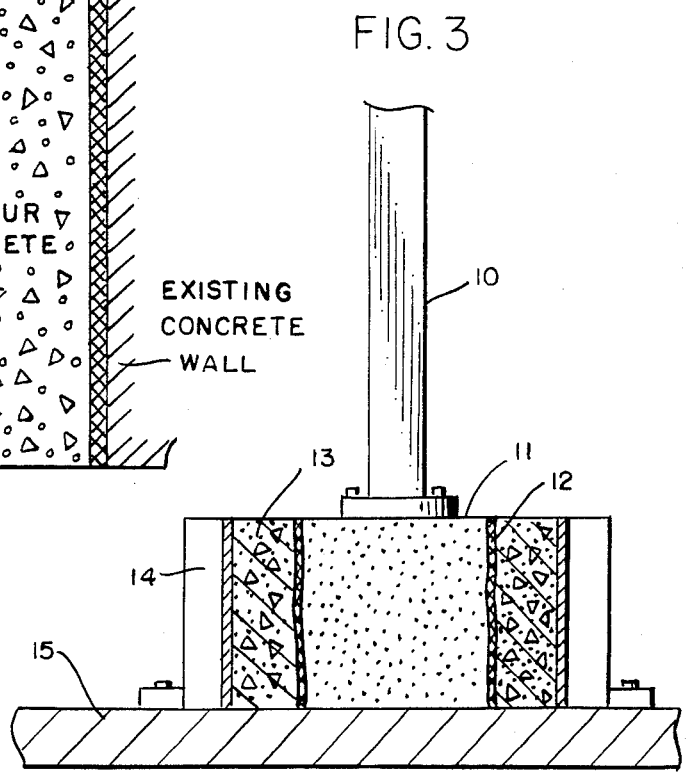

FIG. 3 illustrates the use of the system described in Example 1 for forming a protective overlay around an existing column base. As shown, the roof-supporting column 10 is mounted on a portland cement concrete base 11 which in turn is supported on a floor 15. The bitumen sheet, being of the same kind as described in Example I, is wrapped around the outer surface of the column base 11, being indicated in FIG. 3 as 12. Multiple layers may be used, or the bitumen sheet 12 may be allowed to overlap. However, a single thickness is sufficient for purpose of the present invention providing the entire outer surface of the column base 11 is covered. The form 14 is either circular or square to match the configuration of the column base 11. Within the space provided by the form, there is introduced the molten sulphur concrete, prepared and applied in the manner described in Example I. Because of the relatively short height of the course of sulphur concrete, it is usually not necessary to apply hot air to the top surface. The slip plane provided by the bitumen sheet 12 permits shrinkage to occur during cooling and setting without cracks developing in the sulphur concrete overlay.

EXAMPLE III

Figure 4:
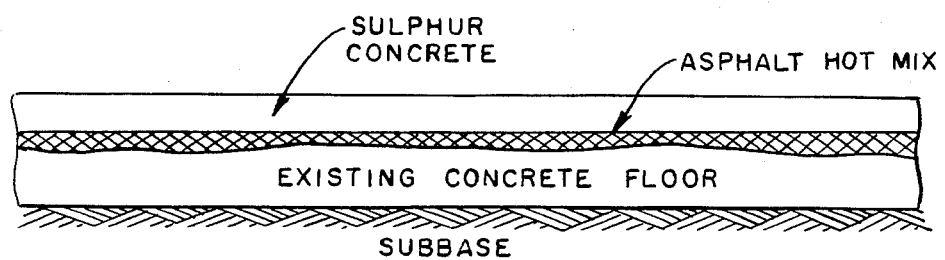
Figure 5:
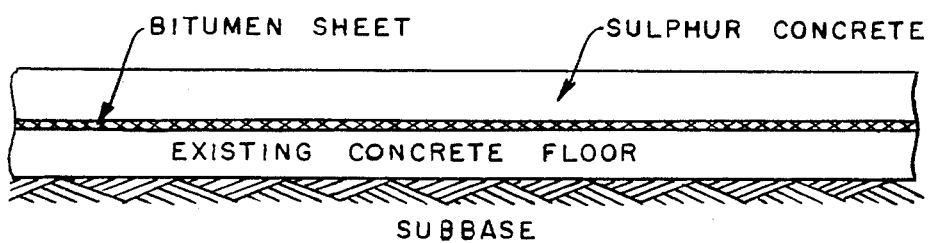

FIGS. 4 and 5 illustrate the application of the method of this invention to forming sulphur concrete overlays on existing concrete floors. As shown in FIG. 4, the existing concrete floor, which is supported on a subbase, has a rough and irregular upper surface. As a first step, therefore, an asphalt hot mix is applied. An example of a suitable mix is (here insert a description of the asphalt including its melting temperature, and a description of the sand, and relative proportions.) The amount of the asphalt hot mix applied is sufficient to fill all of the depressions in the existing concrete floor and form a smooth continuous surface. For example, an asphalt layer of ¼ inch to 4 inches or more may be used. After the asphalt hot mix layer has cooled and solidified, a course of sulphur concrete is applied. The preparation and application techniques are the same as described in Example I.

However, it is preferred to employ a mix of somewhat lower sulphur content, thereby providing a hot mix of higher viscosity than used for pouring walls. Typical proportions are as follows:

| Ingredients | Weight Percent |
| --- | --- |
| Modified Sulphur | 13–14% |
| Class F Fly Ash | 9–11% |
| Quartz Sand | 38–41% |
| Aggregate (Acid Resistant) | 35–38% |

After the consolidation of the poured slab with probe vibrators, the upper surface of the slab is struck and trowled using conventional concrete finishing tools. This must be done quickly because of the rapid cooling of the sulphur concrete surface exposed to the atmosphere. As with the embodiments previously described, the application of the molten sulphur concrete liquifies the upper surface of the asphalt mix, providing a liquid slip plane, which permits the sulphur concrete slab to shrink as a whole without producing cracks.

The embodiment of FIG. 5 is similar to that of FIG. 4, except that the existing concrete floor has a relatively smooth upper surface. This permits the use of a bitumen sheet, such as the bitumen sheet described in Example I. The rest of the process is the same as described with reference to the embodiment of FIG. 4.

In addition to the important functions of the bituminous layer in providing a liquid slip plane which permits shrinkage of the sulphur concrete to occur without the formation of cracks, the bitumen layers or coatings in the completed installations provide an effective seal between the sulphur concrete overlay and the existing wall or floor. The bitumen layer resolidifies with the cooling of the sulphur concrete, producing a continuous seal and bond at the interface. Added protection is therefore provided against the penetration of corrosive liquids to the old portland cement concrete structures.

It should be understood that the method of this invention is not limited to the examples or embodiments described above, which have been set out by way of illustration and not limitation.

We claim:

1. A method of placing sulphur concrete against or over an existing outer solid surface of a wall, floor, or column base, comprising:
    (a) first applying to said outer surface a layer of a bituminous material to form a bitumen-containing exposed surface thereon, the bitumen in said exposed surface becoming liquified at temperatures at which molten sulphur concrete is initially placed;
    (b) pouring a course of molten sulphur concrete mix against or over said bitumen-containing surface, the bitumen therein melting to form a liquid slip plane in contact with said course; and
    (c) setting said layer of bituminous material and said course of sulphur concrete by temperature reduction, whereby said sulphur concrete can shrink during cooling without being restrained by said existing solid surface.

2. The method of claim 1 in which said existing solid surface is a portland cement concrete surface.

3. The method of claim 1 in which said existing surface is a smooth portland cement concrete surface, and said bituminous material is applied to said smooth surface as a preformed sheet.

4. The method of claim 1 in which said existing surface is a rough portland cement concrete floor surface, and said bituminous material is applied as a hot asphalt mix which is solidified before said sulphur concrete mix is poured thereover.

5. The method of claim 1 in which said sulphur concrete is poured at a temperature of from 250° to 290° F., and said bitumen liquifying on being contacted by said poured concrete.

6. A method of placing sulphur concrete against or over an existing relatively smooth surface of portland cement concrete, comprising:
    (a) first applying to said surface a preformed sheet of bituminous material having an outer exposed surface containing bitumen which liquifies at temperatures at which molten sulphur concrete is initially placed;
    (b) pouring a course of molten sulphur concrete mix against or over said bitumen-containing surface, said sulphur concrete being poured at a temperature of from 250° to 290° F., said bitumen liquifying on being contacted by said poured sulphur concrete to form a liquid slip plane in contact with said course; and
    (c) setting said layer of bituminous material and said course of sulphur concrete by temperature reduction, whereby said sulphur concrete can shrink during cooling without being restrained by said existing solid surface.

7. A method of placing sulphur concrete over an existing relatively rough floor-surface of portland cement concrete, comprising:
    (a) first applying to said surface a hot asphalt mix to form a relatively smooth surface layer thereon having an upper surface containing bitumen which liquifies at temperatures at which molten sulphur concrete is initially placed;
    (b) pouring a course of molten sulphur concrete mix over said bitumen containing surface, said concrete being poured at a temperature of from 270° to 290° F., said bitumen liquifying on being contacted by said poured sulphur concrete to form a liquid slip plane in contact with said course; and
    (c) setting said layer of bituminous material and said course of sulphur concrete by temperature reduction, whereby said sulphur concrete can shrink during cooling without being restrained by said existing solid surface.

8. The method of claim 6 in which said existing surface is a wall surface, and said sulphur concrete mix is poured into an open-topped form positioned against said wall surface.

9. A method of placing a sulphur concrete wall against an existing wall of portland cement concrete having a relatively smooth outer surface, comprising:
    (a) first applying to said surface a layer of a bituminous material to form a bitumen-containing exposed surface thereon, the bitumen in said exposed surface becoming liquified at temperatures at which molten sulphur concrete is initially placed;
    (b) pouring into a form positioned against said wall surface a molten sulphur concrete mix to form a wall with an exposed top portion, the bitumen in said exposed surface melting to form a liquid slip plane in contact with said sulfur concrete; and
    (c) setting said layer of bituminous material and said sulphur concrete by temperature reduction while circulating heated air over the top portion of the sulphur concrete wall, whereby said wall can set without cracks or voids.

* * * * *